United States Patent
Deng et al.

(10) Patent No.: US 10,662,488 B2
(45) Date of Patent: May 26, 2020

(54) FLEXIBLE LEATHER SLICE BLANKING APPARATUS AND IMPLEMENTATION METHOD

(71) Applicant: Foshan Shike Intelligent Technology co. LTD, Foshan (CN)

(72) Inventors: Yaohua Deng, Guangzhou (CN); Xiali Liu, Foshan (CN)

( * ) Notice: Subject to any disclaimer, the term of this patent is extended or adjusted under 35 U.S.C. 154(b) by 154 days.

(21) Appl. No.: 15/888,142

(22) Filed: Feb. 5, 2018

(65) Prior Publication Data
US 2019/0241985 A1 Aug. 8, 2019

(51) Int. Cl.
| | |
|---|---|
| *C14B 5/00* | (2006.01) |
| *B25J 11/00* | (2006.01) |
| *G06K 9/00* | (2006.01) |
| *G05B 19/402* | (2006.01) |
| *B25J 9/16* | (2006.01) |

(52) U.S. Cl.
CPC ............. *C14B 5/00* (2013.01); *B25J 9/1697* (2013.01); *B25J 11/0055* (2013.01); *G05B 19/402* (2013.01); *G06K 9/00536* (2013.01)

(58) Field of Classification Search
CPC ....... C14B 5/00; B25J 9/1697; B25J 11/0055; G05B 19/402; G06K 9/00536
See application file for complete search history.

(56) References Cited

U.S. PATENT DOCUMENTS

| | | | | |
|---|---|---|---|---|
| 4,901,359 A | * | 2/1990 | Bruder | B26D 5/00 235/462.01 |
| 5,258,917 A | * | 11/1993 | Bruder | B23K 26/032 348/125 |
| 5,838,569 A | * | 11/1998 | Gane | B26D 5/00 700/134 |
| 6,293,677 B1 | * | 9/2001 | Gallucci | B26D 5/00 353/28 |
| 9,522,474 B2 | * | 12/2016 | Gallucci | B25J 15/0616 |
| 2013/0177215 A1 | * | 7/2013 | Campbell | B26F 1/3813 382/111 |
| 2014/0165806 A1 | * | 6/2014 | Gallucci | B25J 15/0616 83/152 |

(Continued)

FOREIGN PATENT DOCUMENTS

WO   WO-8606676 A1 * 11/1986 ................ B25J 9/00

*Primary Examiner* — Omar Flores Sanchez
(74) *Attorney, Agent, or Firm* — Erson IP (Nelson IP)

(57) ABSTRACT

The present invention discloses a flexible leather slice blanking apparatus and an implementation method. The apparatus comprises a working table, a projector, an industrial camera, an installing support, a manipulator, a matrix chuck fixture and a base. The installing support is arranged on the working table and disposed in a corresponding range of a cutting region behind a numerical-control leather cutting machine. The projector and the industrial camera are respectively arranged on the installing support. The manipulator is installed on the base. The matrix chuck fixture is located above the manipulator and connected with the manipulator through a matrix chuck fixture installing frame. The blanking apparatus provided by the present invention is low in labor cost and high in efficiency; and moreover, leather slices can be classified and collected, thereby saving labor force and increasing production efficiency.

8 Claims, 4 Drawing Sheets

(56) References Cited

U.S. PATENT DOCUMENTS

| | | | |
|---|---|---|---|
| 2015/0209971 A1* | 7/2015 | Bodivit | B26D 5/005 83/19 |
| 2015/0328794 A1* | 11/2015 | Ondrus | B26D 5/00 234/2 |
| 2017/0021519 A1* | 1/2017 | Guo | B26D 7/0625 |
| 2017/0368706 A1* | 12/2017 | Zund | D06H 3/08 |
| 2018/0250809 A1* | 9/2018 | Morimura | B25J 9/0009 |
| 2019/0118328 A1* | 4/2019 | Godot | G05B 19/402 |
| 2019/0149802 A1* | 5/2019 | Tanaka | H04N 13/243 348/43 |

* cited by examiner

FLEXIBLE LEATHER SLICE BLANKING APPARATUS AND IMPLEMENTATION METHOD

FIELD OF THE INVENTION

The present invention relates to the technical field of blanking apparatuses, and particularly relates to a flexible leather slice blanking apparatus and an implementation method.

BACKGROUND OF THE INVENTION

The existing cutting of flexible leather material is developed in a trend of large size and multiple tool bits; the cutting efficiency is higher and higher; the types of slices typeset and cut simultaneously are diversified; and requirements for slice blanking speed are higher and higher. A traditional blanking procedure completely adopts a manual way, and several workers are in charge of the blanking and sorting of one flexible material cutting device, so that the needed labor cost is high, the efficiency is low, and time and labor are wasted.

SUMMARY OF THE INVENTION

A purpose of the present invention is to provide a flexible leather slice blanking apparatus and an implementation method so as to solve the above-mentioned technical problems.

The purpose of the present invention is implemented through the following technical solution:

A flexible leather slice blanking apparatus comprises a working table, a projector, an industrial camera, an installing support, a manipulator, a matrix chuck fixture and a base.

The installing support is arranged on the working table and disposed in a corresponding range of a cutting region behind a numerical-control leather cutting machine.

The projector and the industrial camera are respectively arranged on the installing support.

The manipulator is installed on the base.

The matrix chuck fixture is disposed above the manipulator and connected with the manipulator through a matrix chuck fixture installing frame.

An implementation method of the flexible leather slice blanking apparatus comprises:

A, performing dislocation calibration on a blanking and sorting region, and converting a coordinate of a camera to a view coordinate of a manipulator, thereby realizing the unification of a camera output coordinate system and a robot coordinate system;

B, photographing, by an industrial camera, a projection outline of a pre-cut pattern track in a cutting region;

C, recognizing information about shapes of leather slices of an independent outline region in the projection outline, the number of the leather slices of a same type and the centroid of each leather slice outline;

D, transmitting the information about the shapes, the number and the centroid of the leather slices to the blanking manipulator;

E, classifying, by the blanking manipulator, the types of the outline shapes according to the information of the track region outline;

F, searching the leather slices in a region below the chuck fixture according to the types of the outline shapes; and G, driving the chuck fixture to rotate through the manipulator to realize the blanking, and counting the blanking number.

Compared with the prior art, one or more embodiments of the present invention can have the following advantages:

The blanking apparatus is low in labor cost and high in efficiency; and the leather slices can be classified and collected, thereby saving the labor force and increasing production efficiency.

DETAILED DESCRIPTION OF THE EMBODIMENTS

In order to make the purpose, technical solutions and advantages of the present invention clearer, the present invention is further described below in detail in combination with embodiments and drawings.

Figure 1:
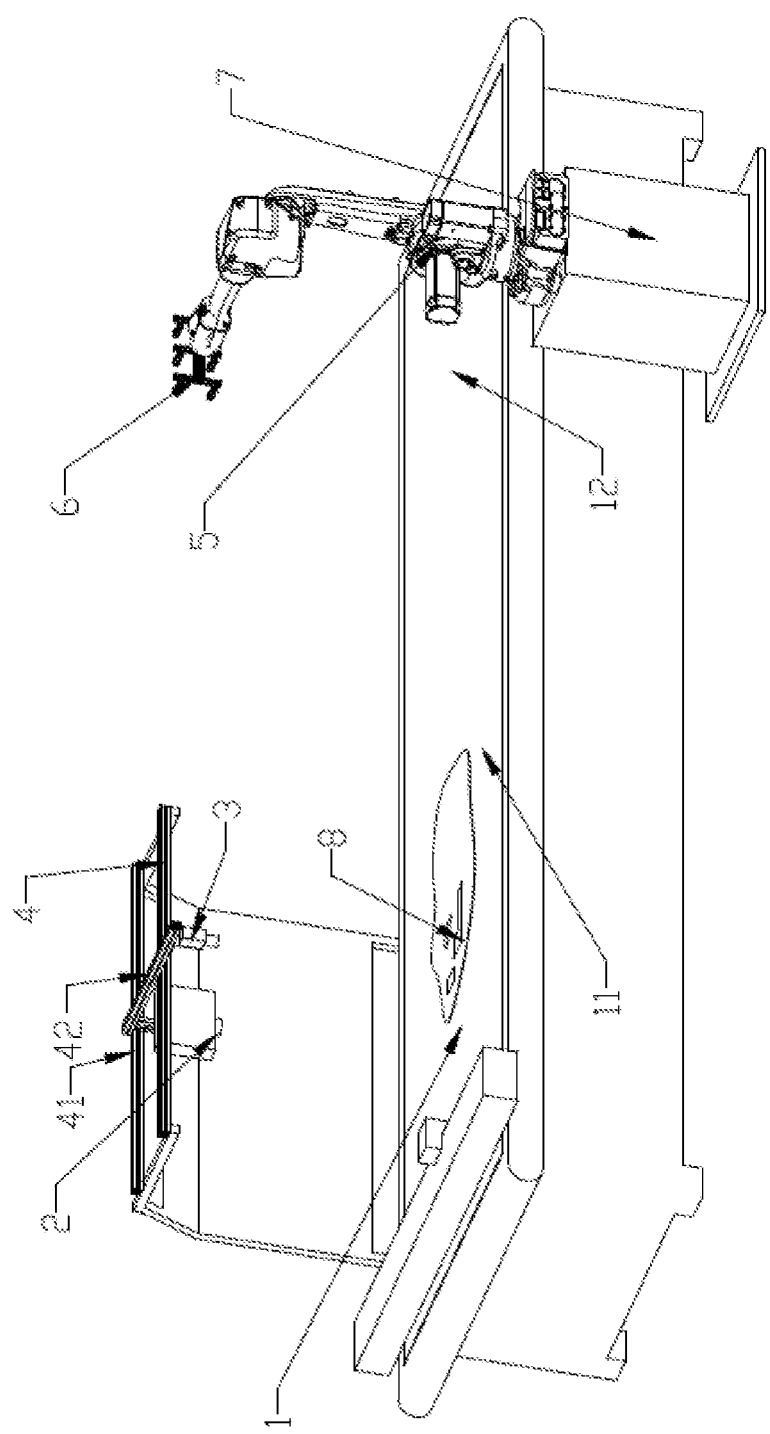
FIG. 1 and FIG. 2 are structural schematic diagrams of a flexible leather slice blanking apparatus.
Figure 2:
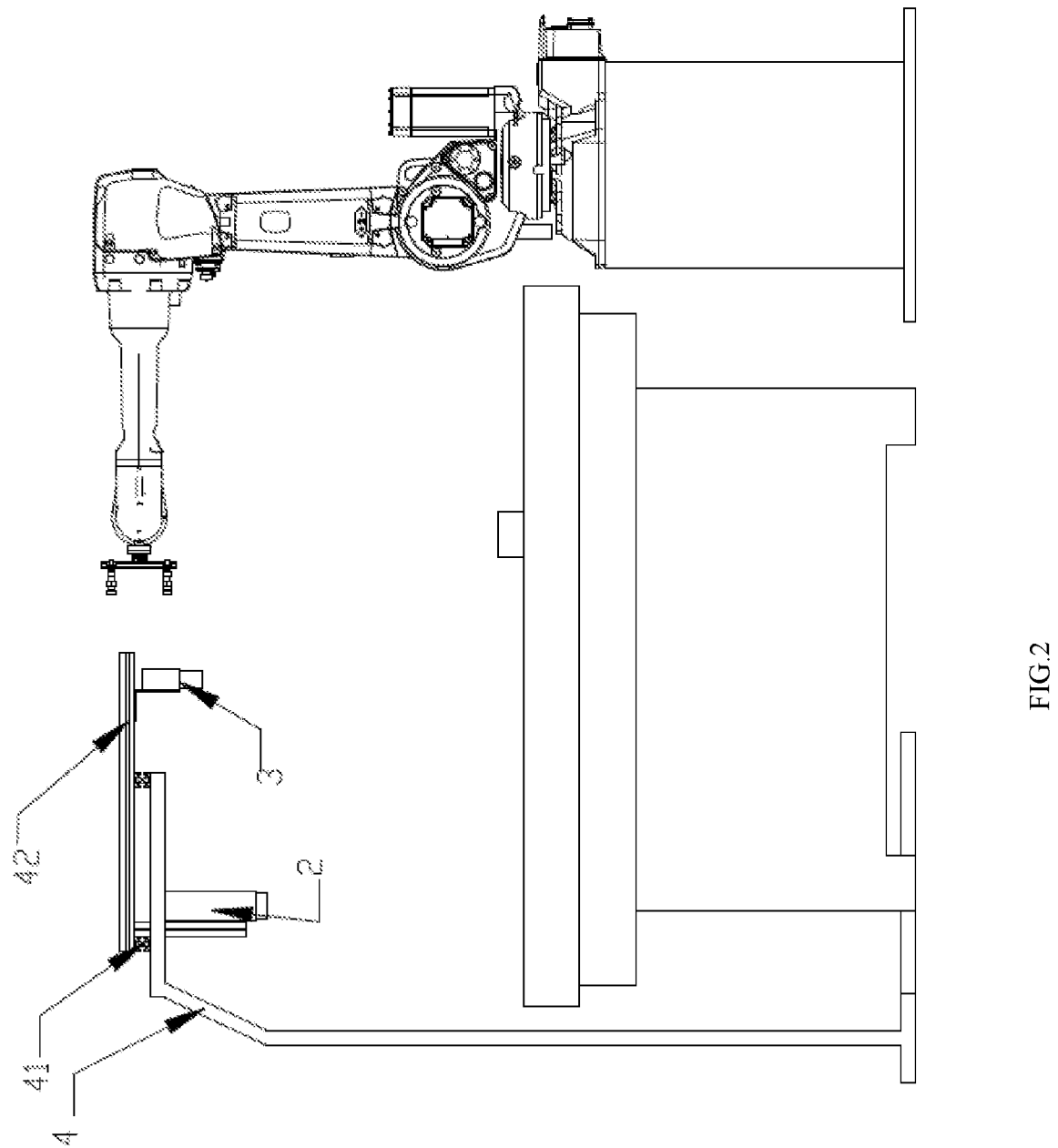

FIG. 1 and FIG. 2 show a structure of a flexible leather slice blanking apparatus. The flexible leather slice blanking apparatus comprises a working table 1, a projector 2, an industrial camera 3, an installing support 4, a manipulator 5, a matrix chuck fixture 6 and a base 7.

The installing support is arranged on the working table and disposed in a corresponding range of a cutting region behind a numerical-control leather cutting machine.

The projector and the industrial camera are respectively arranged on the installing support.

The manipulator is installed on the base.

The matrix chuck fixture is disposed above the manipulator and connected with the manipulator through a matrix chuck fixture installing frame.

The above working table is divided into two portions: a cutting region 11 and a blanking and sorting region 12, and a flexible leather material is cut into slices of various shapes in the cutting region and then transferred to the blanking and sorting region.

Two horizontal supports 41 and one longitudinal support 42 are installed on the installing support, and the bottom of the installing support is formed by welding square steel tubes.

The above projector is installed on the horizontal supports 41; a projection region can cover the cutting region range and has an area of 2500 mm×1600 mm; the industrial camera is installed on the longitudinal support 42 through a right-angle installing plate 31 and disposed right above the cutting region; and a view area range is 2500 mm×1600 mm.

The above manipulator is installed on a heightening base so as to ensure that the working range of the manipulator can completely cover the sorting region.

Figure 3:
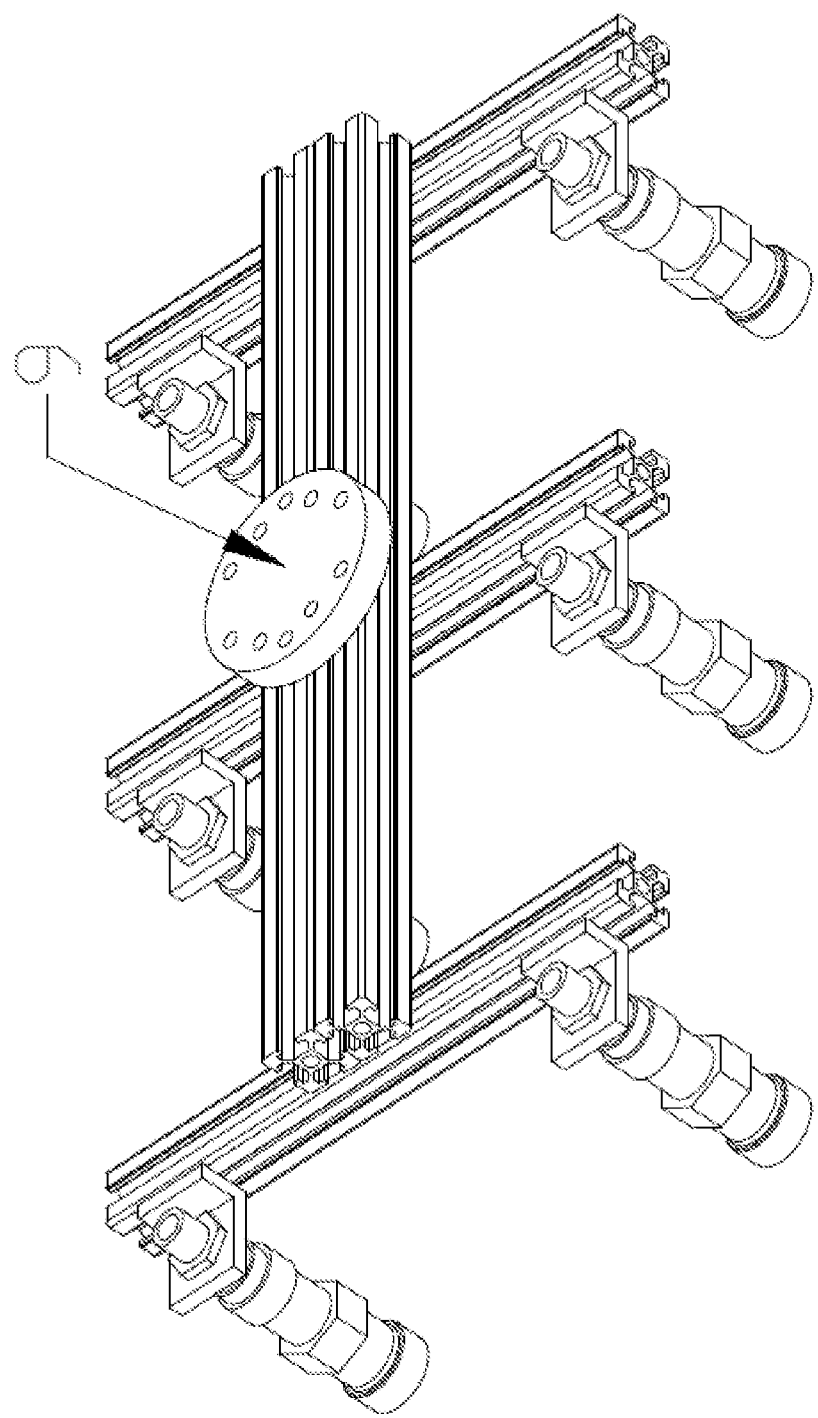
FIG. 3 is a structural schematic diagram of a matrix chuck fixture.

The above matrix chuck fixture is connected with a flange on a front end of the manipulator through a disc 9 (as shown in FIG. 3); and the matrix chuck fixture adopts vacuum chucks with a diameter of 20 mm. Switches of the vacuum chucks are independently controlled and are not influenced one another. The chucks are distributed in a matrix of 2×3, installed on the support through the right-angle installing plates and connected with the flange on the front end of the manipulator through discs. Only the chucks within a boundary of the leather slices to be collected are opened during blanking, and other chucks in the matrix are kept in a closed state.

Figure 4:
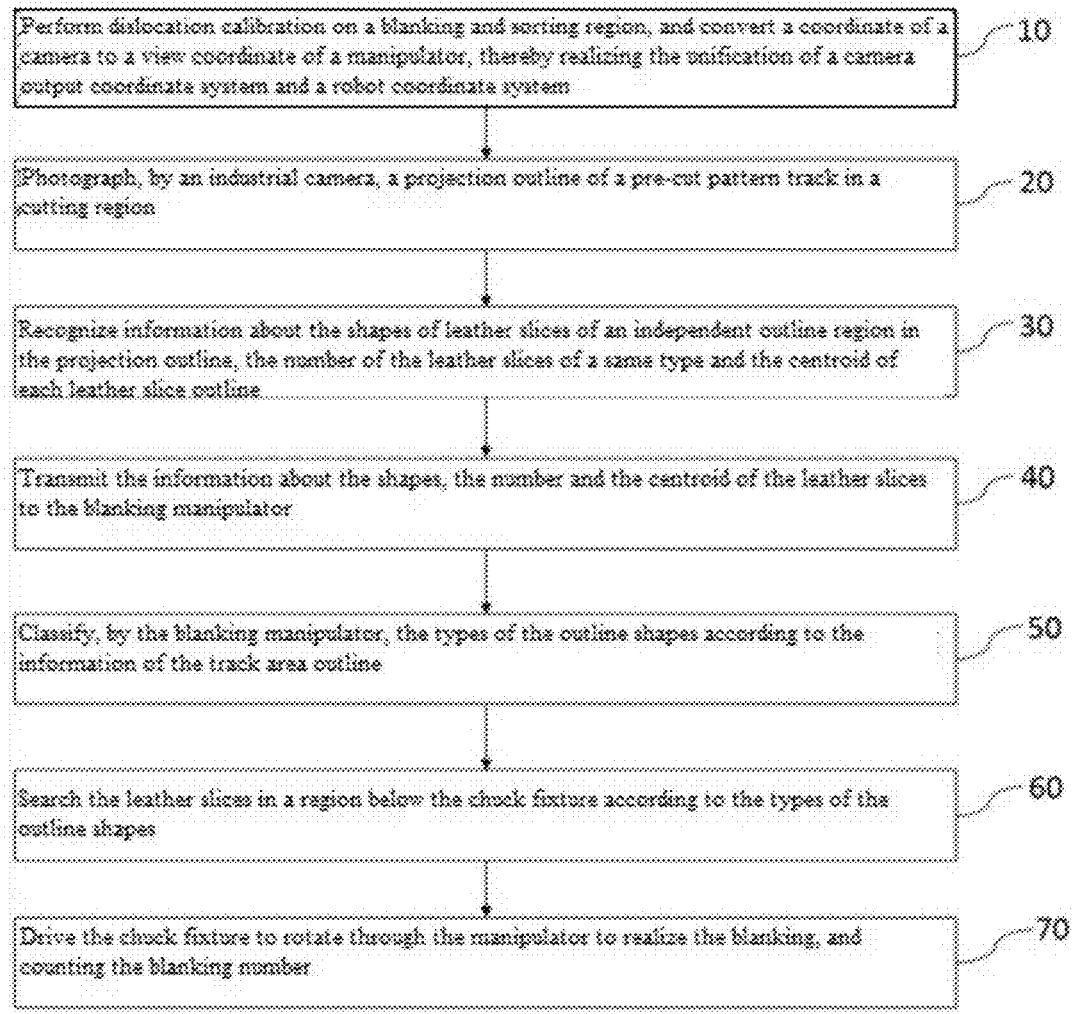
FIG. 4 is a flow chart of an implementation method of a flexible leather slice blanking apparatus.

The present embodiment also provides an implementation method of the flexible leather slice blanking apparatus (as shown in FIG. 4). The method comprises the following steps:

step 10, performing dislocation calibration on a blanking and sorting region, and converting a coordinate of a camera to a view coordinate of a manipulator, thereby realizing the unification of a camera output coordinate system and a robot coordinate system;

step 20, photographing, by an industrial camera, a projection outline 8 of a pre-cut pattern track in a cutting region;

step 30, recognizing information about the shapes of leather slices of an independent outline region in the projection outline, the number of the leather slices of a same type and the centroid of each leather slice outline;

step 40, transmitting the information about the shapes, the number and the centroid of the leather slices to the blanking manipulator;

step 50, classifying, by the blanking manipulator, the types of the outline shapes according to the information of the track area outline;

step 60, searching the leather slices in a region below the chuck fixture according to the types of the outline shapes; and step 70, driving the chuck fixture to rotate through the manipulator to realize the blanking, and counting the blanking number.

In the above step 30, the information about the shapes, the number and the centroid of leather slices in the independent outline region (i.e., each unconnected pattern track region) in the projection outline is recognized through an image segmentation algorithm.

Before the above step 60 is executed, an origin of the matrix chucks is moved to an origin of the blanking and sorting region.

The above step 70 also comprises: the manipulator drives the chuck fixture to perform a serpentine motion search in the blanking and sorting region until the slices of the same shape are completely blanked if the slices of the same shape are not completely blanked.

Although the embodiments disclosed by the present invention are described above, the described embodiments are only embodiments for facilitating the understanding of the present invention, rather than limiting the present invention. Any modification and change can be made to implementation forms and details by those skilled in the art on the premise of not departing from the spirit and scope disclosed by the present invention. However, the protection scope of the patent of the present invention should still be based on the scope defined by appended claims.

We claim:

1. A flexible leather slice blanking apparatus, comprising a working table, a projector, an industrial camera, an installing support, a manipulator, a matrix chuck fixture, and a base, wherein
the installing support is arranged on the working table and disposed in a corresponding range of a cutting region;
the projector and the industrial camera are respectively arranged on the installing support;
the manipulator is installed on the base; and
the matrix chuck fixture is disposed above the manipulator and is connected with a flange on a front end of the manipulator through a disc.

2. The flexible leather slice blanking apparatus according to claim 1, wherein the working table is divided into a cutting region and a blanking and sorting region;
the cutting region is used for cutting a flexible leather material into slices of various shapes; and
the blanking and sorting region is used for sorting the slices.

3. The flexible leather slice blanking apparatus according to claim 1, wherein two horizontal supports and one longitudinal support are installed on the installing support, and the bottom of the installing support is formed by welding square steel tubes.

4. The flexible leather slice blanking apparatus according to claim 1, wherein
the projector is installed on the horizontal supports, and a projection region range covers the cutting region; and
the industrial camera is installed on the longitudinal support through a right-angle installing plate and disposed right above the cutting region.

5. An implementation method of the flexible leather slice blanking apparatus according to claim 1, comprising:
A, performing camera calibration on a blanking and sorting region, and converting a coordinate of a camera to a view coordinate of a manipulator, thereby realizing the unification of a camera output coordinate system and a robot coordinate system;
B, photographing, by an industrial camera, a projection outline of a pre-cut pattern track in a cutting region;
C, recognizing information about shapes of leather slices of an independent outline region in the projection outline, the number of the leather slices of a same type and the centroid of each leather slice outline;
D, transmitting the information about the shapes, the number and the centroid of the leather slices to the manipulator;
E, classifying, by the manipulator, the types of the outline shapes according to the information of the track region outline;
F, searching the leather slices in a region below the chuck fixture according to the types of the outline shapes; and
G, driving the chuck fixture to rotate through the manipulator to realize the blanking, and counting the blanking number.

6. The implementation method of the flexible leather slice blanking apparatus according to claim 5, wherein in the step C, the information about the shapes, the number and the centroid of leather slices in the independent outline region in the projection outline are recognized through an image segmentation algorithm.

7. The implementation method of the flexible leather slice blanking apparatus according to claim 5, wherein before the step F is executed, an origin of matrix chucks is moved to an origin of the blanking and sorting region.

8. The implementation method of the flexible leather slice blanking apparatus according to claim 5, wherein the step G further comprises: driving, by the manipulator, the chuck fixture to perform a serpentine motion search in the blanking and sorting region until the slices of the same shape are completely blanked if the slices of the same shape are not completely blanked.

* * * * *